US006996597B2

(12) United States Patent
Mathur et al.

(10) Patent No.: US 6,996,597 B2
(45) Date of Patent: Feb. 7, 2006

(54) INCREASING PRECISION IN MULTI-STAGE PROCESSING OF DIGITAL SIGNALS

(75) Inventors: Ashish Mathur, New Delhi (IN); Srinivasan Gopalaswamy, New Delhi (IN); Pradeep Jain, New Delhi (IN)

(73) Assignee: Centillium Communications, Inc., Fremont, CA (US)

( * ) Notice: Subject to any disclaimer, the term of this patent is extended or adjusted under 35 U.S.C. 154(b) by 621 days.

(21) Appl. No.: 10/092,927

(22) Filed: Mar. 6, 2002

(65) Prior Publication Data

US 2003/0018677 A1  Jan. 23, 2003

Related U.S. Application Data

(60) Provisional application No. 60/298,347, filed on Jun. 15, 2001.

(51) Int. Cl.
*G06F 7/38* (2006.01)
(52) U.S. Cl. ..................................... 708/550
(58) Field of Classification Search ......... 708/550–551
See application file for complete search history.

(56) References Cited

U.S. PATENT DOCUMENTS

| | | | |
|---|---|---|---|
| 4,511,990 A | | 4/1985 | Hagiwara et al. |
| 5,031,135 A | * | 7/1991 | Patel et al. ................. 708/553 |
| 5,066,952 A | | 11/1991 | Koerner |
| 5,854,758 A | | 12/1998 | Kosuda et al. ......... 364/726.02 |
| 5,941,941 A | * | 8/1999 | Hasegawa ................... 708/551 |
| 6,137,839 A | | 10/2000 | Mannering et al. ......... 375/260 |

OTHER PUBLICATIONS

Chhabra, A. et al.; Application Report SPRA610—Dec. 1999 from Texas Instruments, "A Block Floating Point Implementation on the TMS320C54x DSP" obtained at http://www-s.ti.com/sc/psheets/spra610/spra610.pdf?familyId=324.
DSP Manual from Analog Devices for ADSP-2100—Chapter 6 on "One-Dimensional FFTs" obtained at http://www.analog.com/library/dspManuals/pdf/vol.1/Chapter_6__part$_{13}$ 3.pdf.
Search Report PCT/US02/18593.

* cited by examiner

*Primary Examiner*—Tan V. Mai
(74) *Attorney, Agent, or Firm*—Fenwick & West LLP

(57) ABSTRACT

Precision of multi-stage digital signal processing is increased by preserving least significant bits of one or more output samples of a particular processing stage, having finite word widths, while avoiding the loss of most significant bits. The technique is applicable to one or more stages of multi-stage digital signal processing, thereby increasing precision therein and the signal-to-noise ratio. A plurality of output samples are calculated using a plurality of input samples, and the dynamic range of one or more of the output samples is decreased if the output sample can be represented in a smaller dynamic range without losing a significant bit. The input samples of a particular stage, obtained from the output samples of a previous stage, may further be normalized so that the input samples are represented in the same dynamic range before being processed.

33 Claims, 5 Drawing Sheets

INCREASING PRECISION IN MULTI-STAGE PROCESSING OF DIGITAL SIGNALS

CROSS REFERENCE TO RELATED APPLICATIONS

This application claims the benefit under 35 U.S.C. § 119(e) of U.S. Provisional Application No. 60/298,347, filed Jun. 15, 2001, which is herein incorporated in its entirety by reference.

BACKGROUND OF THE INVENTION

1. Field of the Invention

The invention relates to the processing of digital signals and, in particular, to methods and apparati for improving the performance of multi-stage digital signal processing having a finite precision.

2. Description of Background Art

Sophisticated algorithms for processing blocks of digital signals to improve system performance are widely applied in communications systems, image/sound/video processing systems, and storage systems. For example, in some communications systems, digital data is modulated and processed through several stages of interpolation/decimation finite/infinite impulse-response filters, e.g., at both the transmitter and the receiver. Several digital signal processing algorithms (or a sequence of such algorithms) are executed in multiple stages, where each stage employs finite word lengths for its input and output. The use of multiple stages provides increased efficiency in speed, power consumption, memory usage, and cost.

Various xDSL systems, such as asymmetric DSL, use discrete multi-tone (DMT) modulation to modulate digital data over a transmission medium, such as carrier lines. By applying an Inverse Fast Fourier Transform (IFFT) to the data signal, DMT provides for efficient frequency division multiplexing of the digital data. The output of the IFFT is further treated by multi-rate digital filters before the interface to an analog front-end. The analog front-end transforms the final digital data into a continuous-time waveform suitable for transmission over the transmission medium. At the receiver, the received continuous-time waveform is sampled and digitized. The digitized signal is further processed through several multi-rate digital filters and demodulated by a Fast Fourier Transform (FFT) before being passed to an estimation device. Typically, the IFFT and FFT are performed in multiple stages by algorithms such as a decimation-in-time (DIT) algorithm or a decimation-in-frequency (DIF) algorithm.

FIG. 1 illustrates a general representation of multi-stage processing of digital signals. The multi-stage processing comprises a series of stage processes 100, in which a set of digital data is transformed from a set of input samples 110 into a set of output samples 120. The N stage processes 100 typically include multiple stages of several constituent processing blocks (e.g., FFT, IFFT, multi-stage interpolation/decimation filters). The input samples 110 and output samples 120 comprise digital data expressed as a set of binary numbers.

One or more memory segments 130 may be provided for each stage process 100, coupling adjacent stage processes 100 so that the digital signal can be communicated from one stage to the next. FIG. 1 illustrates the flow of the digital signal as the data are stored in and then retrieved from each memory segment 130. For example, in the first stage 100 (n−1), several samples from the input block may be arithmetically combined, multiplied with coefficients, or otherwise manipulated, and further combined to produce a block of output samples 120(n−1). This block of output samples 120(n−1) from the first stage serves as the input samples 110($n$) to the second stage for similar processing, and so on. In this way, the output samples 120(n−1) of an $(n-1)^{th}$ stage are used as the input samples 110($n$) of an $n^{th}$ stage, and the output samples 120 of the $n^{th}$ stage are used as the input samples 110(n+1) of an $(n+1)^{th}$ stage. For the last stage N, an $(N+1)^{th}$ memory segment 130(N) may also be provided for storing the output samples 120(N).

At each stage n, the output samples 120($n$) are represented by a finite word width, b(n+1), which is determined by the word width allocated to each memory segment 130(n+1) of the $(n+1)^{th}$ stage. In many cases, the same memory can be used to store both the input and output of a stage, as is typically done in IFFT/FFT implementations. The output samples 120($n$) of the $n^{th}$ stage are stored in the memory segments 130(n+1) for the $(n+1)^{th}$ stage. Accordingly, the word width b(n+1) in the memory segments 130(n+1) for the $(n+1)^{th}$ stage determines the word width allocated for storing the output samples of the $n^{th}$ stage. Moreover, this word width b(n+1) corresponds to the word width for the input samples of the $(n+1)^{th}$ stage.

The arithmetic operations in an arbitrary $n^{th}$ stage of processing could require a larger word width to represent the output samples in the same dynamic range than that allocated for the output samples. In conventional processing, when this happens, the most significant bits are retained at the output of the stage while the least significant bits are lost. This "rounding" of the binary numbers leads to a loss of precision. If the number of stages is large, as it is in a typical digital signal processing application, the aggregate effect of lost least significant bits could lead to a substantial error in the digital signal due to the finite precision in the digital signal processing. This error decreases the signal-to-noise ratio (SNR), which decreases the ability of the system to transmit data and, ultimately, decreases data transfer rates. Generally, a low SNR causes frequent errors necessitating retransmission of data, thereby decreasing the system efficiency and overall transfer rate.

A signal value can be represented digitally by a finite number of bits in various dynamic ranges. In two's complement notation, for example, four binary bits represent a signal value of "6" as "0110" in the dynamic range [−8,7], or "0011" in the dynamic range [−16,14]. However, the signal value of "6" cannot be represented in the dynamic range [−4,3.5] without losing a significant digit (i.e., the leftmost "1" other than the sign bit). In another example, using four bits and two's complement notation, the signal value "7" cannot be represented in the dynamic range [−16, 14] without a loss of precision. Representing the signal value "7" in this case requires that the value be rounded up to 8 (expressed as "0100") or down to 6 (expressed as "0011"). It is thus apparent that precision decreases as the dynamic range in which a signal value is represented increases (assuming there are not enough bits to represent the specified dynamic range).

At a particular stage of the processing, the output samples of the arithmetic computations typically need to be stored in memory, which is often constrained to be a certain number of bits. The signal processors may have the ability to express the output samples with a greater number of bits than are allocated for the samples in memory, so often the output samples must be truncated before being stored in memory. A conventional approach is to represent the output signal in the largest dynamic range in which the output samples can possibly be, without considering the actual value of the output samples. From the signal processing perspective, as demonstrated above, it is desirable to represent the output signal value in the smallest dynamic range possible without losing significant digits. This maximizes precision and thereby increases the overall SNR in the system by minimizing the quantization noise resulting from the loss of least significant bits. For example, if the digital output at a particular stage of processing has five bits, b4b3b2b1b0, but only four bits can be stored in the memory, the conventional approach is to take bits b4b3b2b1 regardless of the value of the output signal. However, it is advantageous to keep bits b3b2b1b0, provided that there is no loss of significant digits—i.e., bit b4 is not significant, like a leading "0" bit or a sign extension.

What is needed therefore are techniques for increasing the precision of digital signal processing by preserving the least significant bits in the output samples of a multi-stage digital signal processing block having finite word widths, while avoiding the loss of most significant bits.

SUMMARY OF THE INVENTION

Embodiments of the invention increase the precision of digital signal processing by preserving the least significant bits in output samples having finite widths, while avoiding the loss of most significant bits. In one embodiment, a method comprises calculating a plurality of output samples using a plurality of input samples, and decreasing the dynamic range of one or more of the output samples if the output sample can be represented in a smaller dynamic range without losing a significant bit. In an aspect of an embodiment, precision is maintained at the output of one or more stages by selecting for one or more of the output samples a dynamic range that is the larger of (1) the smallest dynamic range in which the output sample can be represented without losing a significant bit, and (2) the largest dynamic range selected for any previously processed output sample. In another aspect of an embodiment, the input samples of a particular stage, obtained from the output samples of a previous stage, are normalized so that the input samples are represented in the same dynamic range before being processed.

The embodiments may advantageously be applied to one or more stages of multi-stage digital signal processing, thereby increasing precision in the one or more stages. The increased precision achieved for several stages may significantly increase the precision of the overall multi-stage digital signal processing, thereby increasing SNR.

In one embodiment, a device includes a calculation module adapted to compute a set of output samples using a set of input samples, and a post-calculation module operatively coupled thereto, the post-calculation module adapted to decrease the dynamic range of at least one of the output samples for at least one stage if the output sample can be represented in a smaller dynamic range without losing a significant bit. Other embodiments of the device include a pre-calculation module for normalizing the dynamic ranges of the input samples, memory for storing processed and shifted output samples, and/or a dynamic range summer for tracking a cumulative decrease in dynamic range for the multiple stages. In some embodiments, the stages of processing and selection of dynamic ranges are performed by the same calculation and post-calculation modules. In other embodiments, a plurality of calculation and post-calculation modules are coupled together, each pair performing one or more of the various stages. The methods and devices described herein may be advantageously implemented within a DSL modem to enhance the performance thereof.

DETAILED DESCRIPTION OF THE PREFERRED EMBODIMENTS

Figure 1:
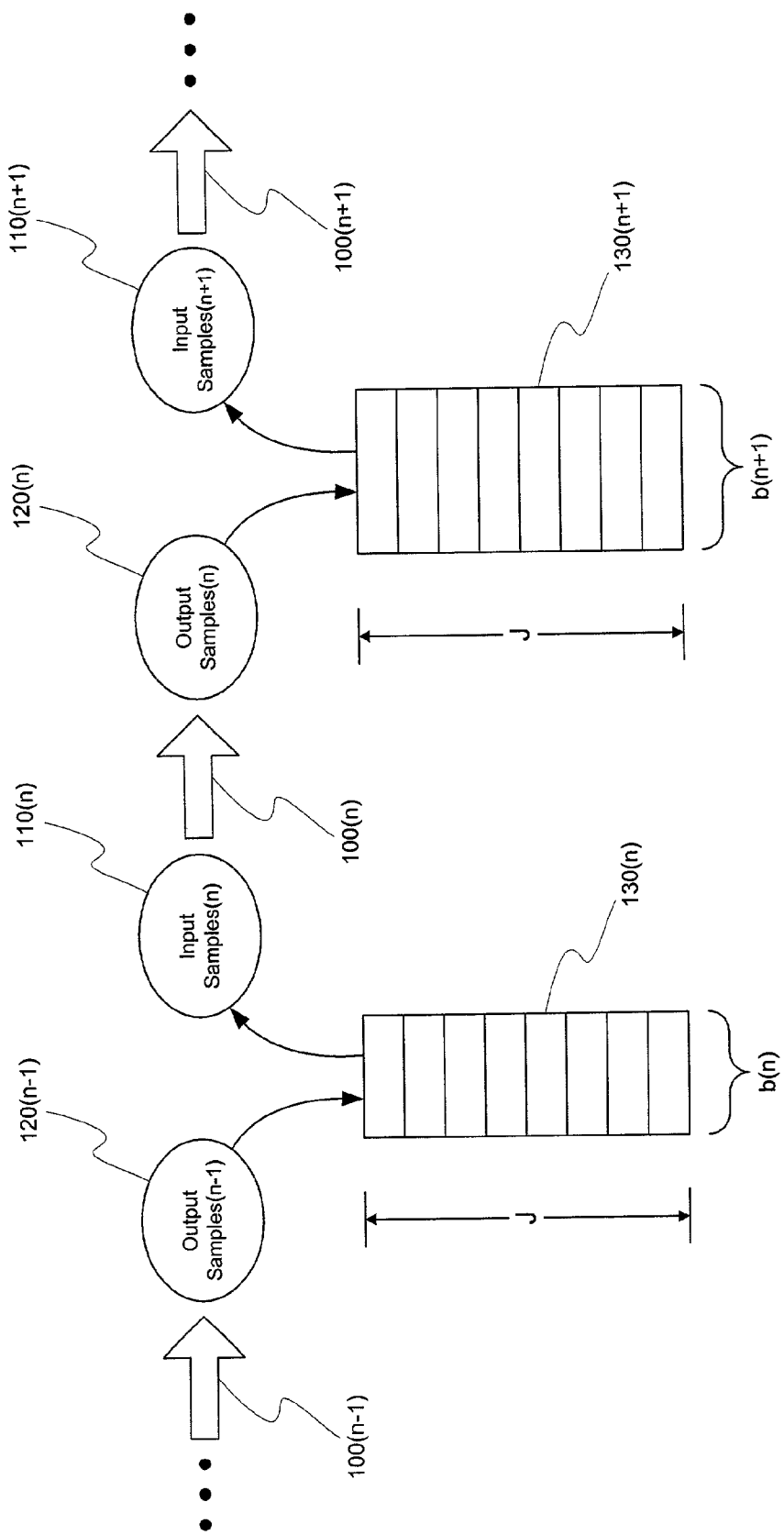
FIG. 1 is a diagram of a general multi-stage digital signal processing scheme.

An embodiment of the present invention is advantageously applied to multi-stage digital signal processing, such as the process illustrated in FIG. 1. This signal processing involves one or more stages wherein the digital signal is expressed in memory segments 130 having a finite number of bits. Expressing the signal in finite memory can lead to error, or noise, caused by the loss of least significant bits (i.e., "rounding off" due to truncation); however, the present invention reduces this error.

The following table illustrates an example to demonstrate one advantage of the present invention. A typical stage in multi-stage digital signal processing involves a large set of data; however, only one sample is described here for explanation purposes.

|  | Input (stage n) | Output (stage n) |
| --- | --- | --- |
| Word width | b(n) = 4 bits | b(n + 1) = 5 bits |
| Signal value (decimal) | 6 | 2.75 |
| Dynamic range | [−8,7] | [−4,3.75] |
| Sample (binary) | 0110 | 01011 |

In this example, a particular stage of processing, n, receives an input of "6". If this input sample is stored in two's complement notation using 4 bits in the dynamic range [−8,7], it would be expressed with the bits "0110". Using the input sample, and perhaps other input samples, the stage processing produces an output sample of "2.75". In this example, a 5-bit word width is allocated for the output samples of this stage. In conventional signal processing, this output sample might be stored as "00101" (rounded to "2.5") in a dynamic range of [−8,7.5]; thus, the least significant bit is discarded and the signal is degraded. However, in accordance with an embodiment of the invention, the dynamic range of the output sample is decreased to [−4,3.75], and in that dynamic range the output sample is represented as "01011". Because more least significant bits (LSBs) are retained in the output sample, the output sample contains a more accurate representation of the digital signal. It is thus desirable in a multi-stage digital signal process to represent the digital signal values in a smaller dynamic range without losing significant digits. Accordingly, a mechanism for tailoring the dynamic range of the digital signal being processed facilitates this desirable outcome.

Figure 2:
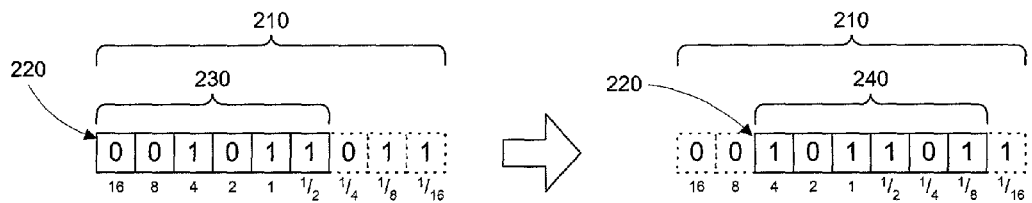
FIG. 2 is a diagram that depicts the decreasing of the dynamic range of an output sample.

FIG. 2 illustrates how the dynamic range of an output sample can be changed to improve calculation precision in a stage of processing in accordance with an embodiment of the present invention. In this example, a signal value 210 of "5.6875" (e.g., for a given $j^{th}$ sample of the $n^{th}$ stage) is depicted in binary form with nine bits. The location 220 allocated for storing the signal value 210 is six bits wide; therefore, the signal value 210 must be truncated. The pre-shifted output sample 230 has a dynamic range of [31.5,0], where the numbers below each bit show the value of the bit for the chosen dynamic range. In the pre-shifted output sample 230, the two leftmost bits stored in location 220 are not significant, as they are leading "0"s. (Note that there is no sign bit in this example.) The three rightmost LSBs would not fit in the location 220 and are thus discarded, in conventional processing. Therefore, the value actually stored in location 220 is "5.5", which leads to a 3.3% error from the true signal value 210 due to truncation.

In accordance with an aspect of the invention, the dynamic range of the output sample is shifted to increase the precision of the stored data. In this example, the dynamic range of the location 220 is changed from [31.5,0] to [7.875,0], as shown by the numbers below each bit. Decreasing the dynamic range results in a higher precision output sample 240. Shifted output sample 240 represents the value "5.625", which has the significantly lower error of 1.1% compared to the pre-shifted output sample 230. Multiplied by a large number of samples J and a large number of stages N, the resulting increase in precision for a multi-stage digital signal processor can be significant. Increasing precision increases the SNR, which allows for a greater amount of data to be transferred over a data line.

Figure 3:
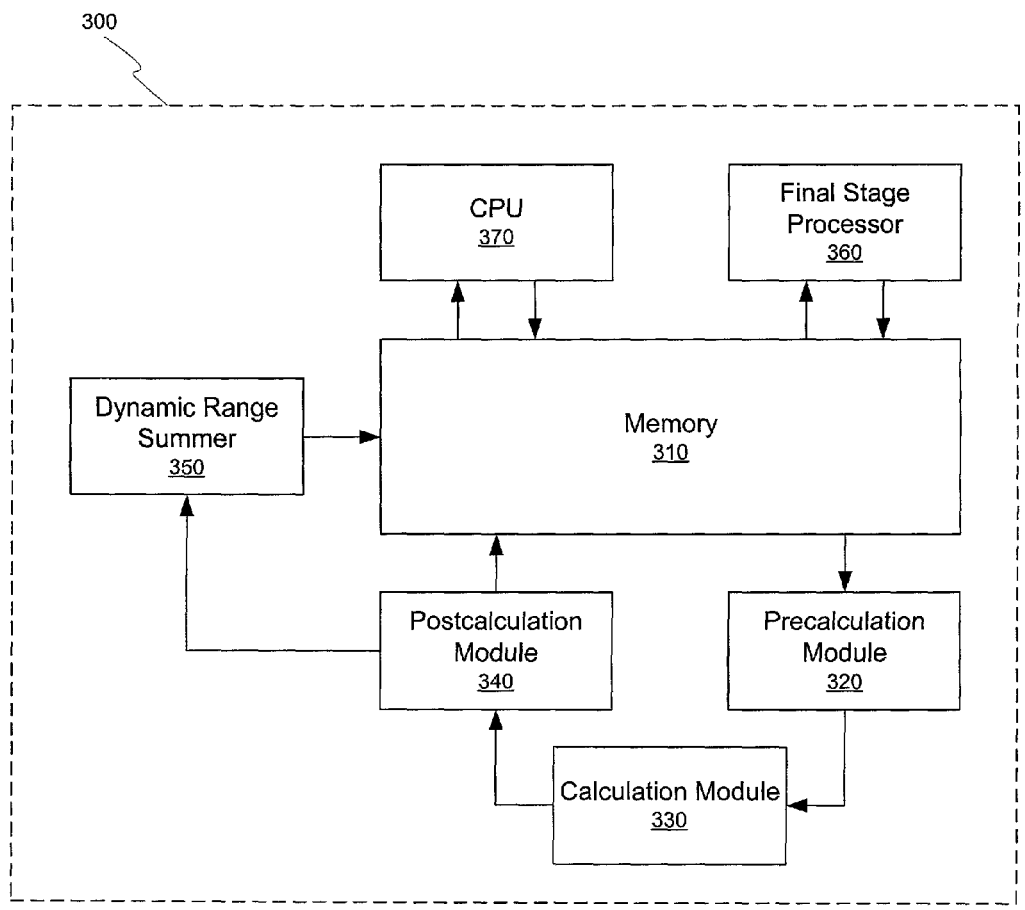
FIG. 3 is a schematic of a digital signal processor according to an embodiment of the invention.

Accordingly, principles of the present invention increases the precision of intermediate output samples in multi-stage digital signal processing. The techniques described herein can generally be used in any environment where data samples are processed over multiple stages. FIG. 3 depicts in block diagram form an embodiment of the present invention implemented in a sample digital signal processing system 300. System 300 includes a memory 310, a pre-calculation module 320, a calculation module 330, a post-calculation module 340, a dynamic range summer 350, a final stage processor 360, and a central processing unit (CPU) 370. The pre-calculation module 320, calculation module 330, post-calculation module 340, dynamic range summer 350, and final stage processor 360 can each be implemented as hardware, software, firmware, or some combination thereof. For example, these modules can be implemented as software instructions executing on one or more digital signal processors (DSP) or other suitable processing environment (e.g., CPU 370). Alternatively, these modules can be implemented as one or more application specific integrated circuits (ASIC) or other high-speed silicon process.

Memory 310 can be any conventional memory device, such as random access memory (RAM) or flash memory. Alternatively, memory 310 can be a cache memory internal to CPU 370. Memory 310 is adapted to store samples used for calculation and processing by system 300. Memory 310 may store other information as well, such as any coefficients used for the calculations. Memory 310 is coupled to the pre-calculation module 320 for providing sample values thereto, and is further coupled to the post-calculation module 340 for receiving values therefrom and storing them. Memory 310 is also coupled to the dynamic range summer 350 and the final stage processor 360. Pre-calculation module 320 performs operations on the sample values that it receives from memory 310, as described in more detail below with respect to FIGS. 4 and 5. Pre-calculation module 320 is further adapted to provide at least one input sample to calculation module 330. Calculation module 330 is any function-applying device, such as a combination of a multiplier, adder, subtracter, divider, or some combination thereof. Generally, calculation module 330 implements the functionality of one or more stages of the multi-stage digital signal processing, such as modulation or filtering stages. Calculation module 330 provides at least one output sample to post-calculation module 340. Post-calculation module 340 performs operations on the output samples received from calculation module 330, described in more detail with reference to FIGS. 4 and 6. Memory 330 is adapted to store output samples received from the post-calculation module 340.

The methods and devices described herein may be advantageously implemented within a DSL modem to enhance the performance thereof. In one embodiment, system 300 shown in FIG. 3 is implemented in a digital signal processor (DSP) chip of a DSL modem. Because DSL modems often employ many signal processing techniques that use multiple stages of processing, such as discrete multi-tone (DMT) modulation, the system 300 advantageously increases the precision, SNR, and, ultimately, data transfer rates.

Figure 4:
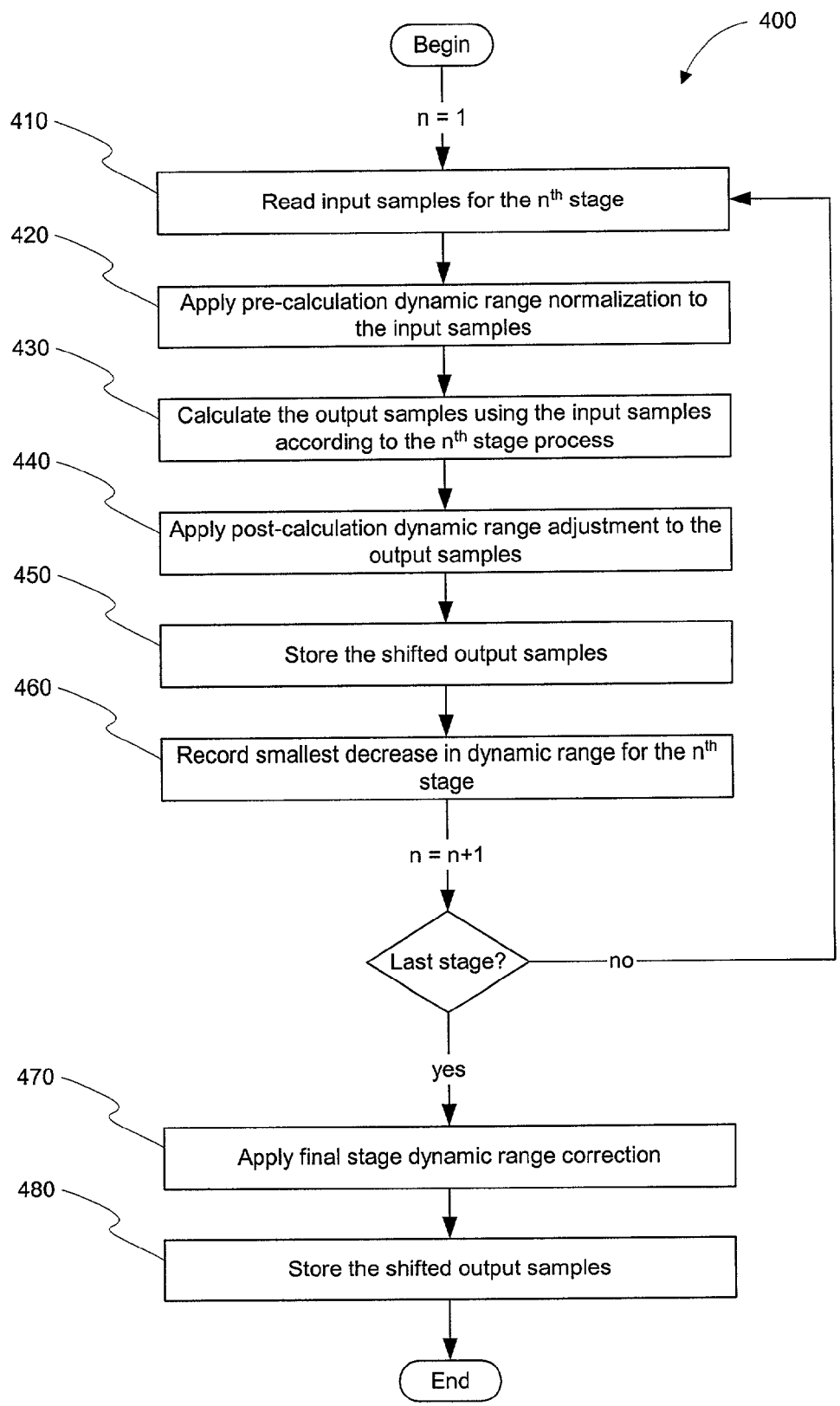
FIG. 4 is a flow chart of the multi-stage digital signal processing according to an embodiment of the present invention.
Figure 5:
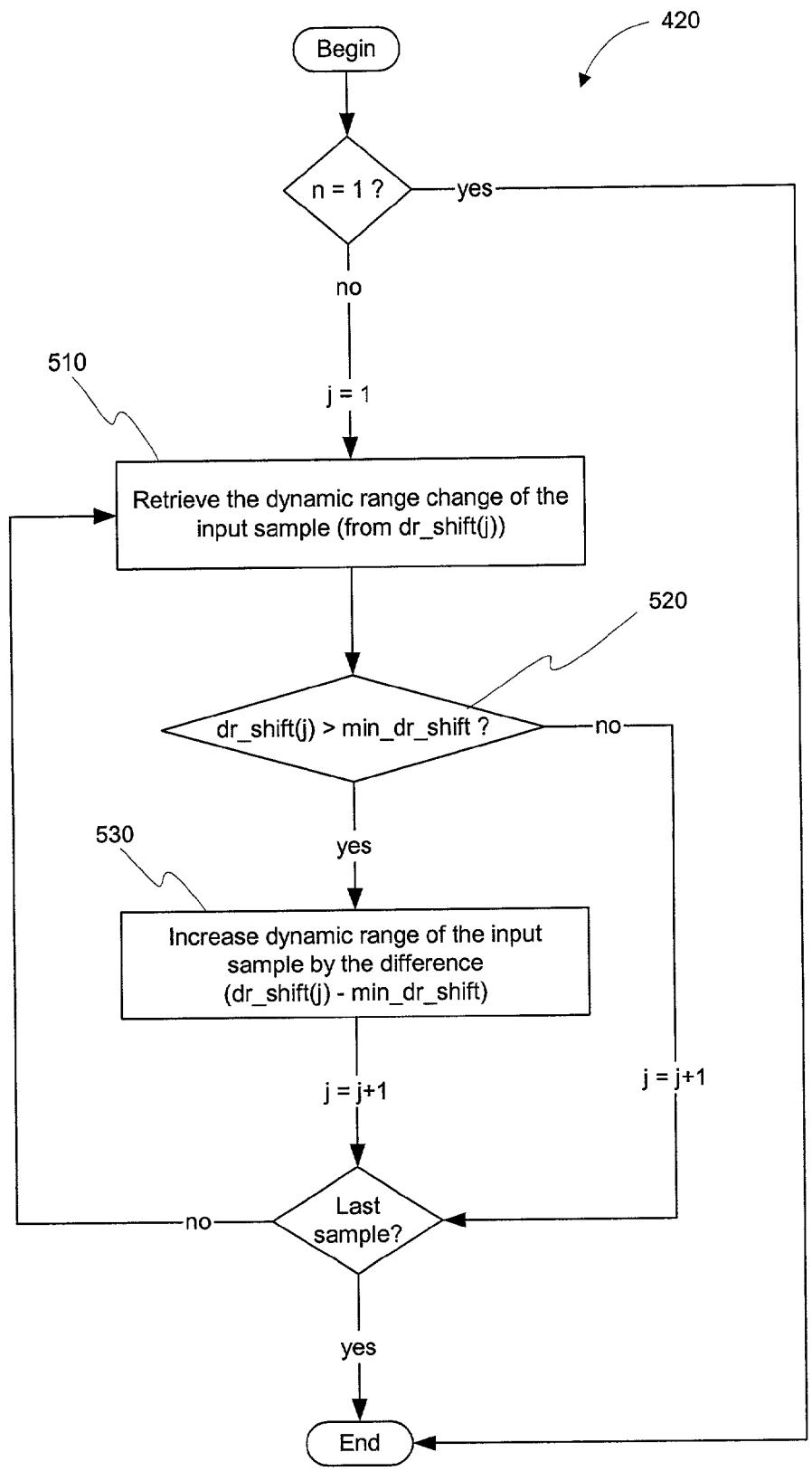
FIG. 5 is a flow chart of a preprocessing method according to an embodiment of the present invention.

An algorithmic overview of the operation of system 300, in accordance with one embodiment of the present invention, is shown in the flow chart of FIG. 4. The following table describes variables used in the discussion of this embodiment.

| Variable | Brief Description |
|---|---|
| n | A value that represents the current stage, which is included in a group of stages ranging from 1 to N |
| j | A value that represents the current sample, which is included in a group of samples ranging from 1 to J |
| input sample(n,j) | A value that represents the $j^{th}$ input for the $n^{th}$ stage process 100 |
| output sample(n,j) | A value that represents the $j^{th}$ output for the $n^{th}$ stage process 100 |
| dr_shift(j), where j = 1 to J | For a given stage, a value that represents the decrease in dynamic range in which the $j^{th}$ output sample is represented relative to the dynamic range in which the $j^{th}$ input sample is represented |
| min_dr_shift(n), where n = 1 to N | A value that represents the smallest decrease in dynamic range of the output samples of the $n^{th}$ stage-i.e., the smallest dr_shift(j) for the $n^{th}$ stage |
| dr_cnt | A value that represents the cumulative of the minimum dynamic range changes for stages 1 through N |

For each of the J output samples 120 within a memory segment 130, the variable array dr_shift(j), where j=1 to J, is allocated to record the decrease in dynamic range of the corresponding output sample 120 from the input sample 110 of that stage n. For each of the N stages, a variable min_dr_shift(n), where n=1 to N, records the smallest decrease in dynamic range of the output samples 120 for each stage. Variable dr_cnt records the cumulative minimum dynamic range change for all stages 1 through N. The variable arrays dr_shift(j) and min_dr_shift(n) and the variable dr_cnt may each be stored in memory 310 or located in a register of, e.g., the post-calculation module 340 or dynamic range summer 350 of system 300.

In the present context, a decrease in dynamic range is defined to be a positive change or shift in dynamic range.

More specifically, the leftmost bits that are not significant (such as leading "0"s and sign extensions) are effectively shifted out of the process and therefore ignored. For each leftmost bit that is shifted out, one more rightmost bit can be shifted in. This act of shifting to eliminate the non-significant leftmost bits effectively reduces the dynamic range of the data sample.

The operation of system 300 can be described as applied to the general multi-stage processing illustrated in FIG. 1. In such a process, recall that input samples 110 of a particular stage are derived from the output samples 120 of the previous stage, which were derived using the input samples 110 of that previous stage according to the stage process 100 of that previous stage. In one embodiment, the input samples 110 are read from the memory 310, and the output samples 120 are stored on the memory 310. Because the stage processes 100 can be performed sequentially in time, some or all of the memory segments 130 can overlap or share memory locations in memory 310.

FIG. 4 depicts an example process 400 in accordance with an embodiment of the present invention. This method can be performed, for example, by the system 300 of FIG. 3, although other embodiments and configurations will be apparent in light of this disclosure. As shown, the process 400 begins with the first stage, where n=1. At the beginning of the process 400, the variable arrays min_dr_shift(n) for n=1 to N and dr_shift(j) for j=1 to J are initialized, e.g., set to 0.

The input samples 110 for the current stage are first read 410 from a memory 310, or other storage facility. The input samples 110 may be read by the pre-calculation module 320, which is coupled to the memory 310. Before the stage process 100 for the $n^{th}$ stage is performed, the dynamic range of each of the input samples 110 is normalized 420. The normalizing 420 may be trivial for the first stage, assuming that the input samples 110 provided thereto have the same dynamic range; however, the input samples 110 of subsequent stages may not have the same dynamic range.

Normalizing 420 the input samples 110 is necessary for a typical system 300 in which the calculation module 330 requires all of the input samples 110 to be expressed in the same dynamic range. A calculation module 330 could be programmed or otherwise configured to compensate internally for any differences in dynamic ranges among the input samples 110. In an embodiment, for example, the calculation module 330 keeps track of the cumulative or relative dynamic range changes for each of the input samples 110. With this information, the calculation module 330 adjusts the dynamic range of the input sample 110 as needed within the calculation module 330. In such a system, it is not necessary to normalize the dynamic ranges of the input samples 110 before providing them to the calculation module 330, and any additional rounding due thereto is eliminated.

Normalizing 420 the input samples 110 is performed in a pre-calculation module 320. One embodiment of a normalizing procedure 420 is shown in detail in FIG. 5, which depicts an embodiment of the pre-calculation normalizing 420 of process 400. Generally, the normalizing 420 is performed by pre-calculation module 320, which may be integrated into calculation module 330. Normalizing 420 the input samples 110 before transmitting them to the calculation module 330 ensures that the dynamic ranges are the same for all of the values used in the calculation module 330. In one embodiment of the pre-calculation normalizing 420, the following actions 510 through 530 are performed for each $j^{th}$ input sample 110 (e.g., for j=1 to J).

It is assumed that the inputs for the first stage are provided in the same dynamic range, so, for n=1, the normalizing process 420 is skipped. In stages other than the first stage, for each $j^{th}$ input sample 110, the pre-calculation module 320 retrieves 510 the dynamic range change of the current input sample 110. This value can be read from the array dr_shift(j) associated with the previous stage, as the dynamic range of the input samples 110 of the present stage corresponds to the dynamic range of the output samples 120 of the last stage.

The pre-calculation module 330 then determines 520 if the decrease in dynamic range of the current input sample, dr_shift(j), is greater than the smallest decrease in dynamic range of all the input samples, min_dr_shift. If not, then the input sample 110 does not need to have its dynamic range increased, and the pre-calculation module 330 processes the next input sample 110 by incrementing j and repeating action 510. If dr_shift(j) is greater than min_dr_shift, the dynamic range of the input sample 110 is increased 530 by the amount of the difference (dr_shift(j)−min_dr_shift) so that the input sample 110 is expressed in the largest dynamic range associated with the set of input samples 110. The dynamic range of an input sample 110 can be increased 530, for example, by deleting a particular number of least significant bits and sign extending the most significant bit by the same amount. This process results in setting the dynamic range of each of the input samples 110 to be the same—specifically, to be the largest dynamic range in the set of input samples 110. Setting the dynamic ranges of the input samples 110 to a larger dynamic range would decrease precision, whereas setting the dynamic ranges to a lower dynamic range would result in the loss of significant bits in one or more of the input samples 110.

Referring back to FIG. 4, the calculation module 330 receives the input samples 110 (now normalized to have the same dynamic range) from the pre-calculation module 320 and then calculates 430 a set of output samples 120 using the set of input samples 110. The calculation module 330 is adapted to perform any programmed operation, mathematical or other, on the output samples 100 according to the stage process 100 that corresponds to the current stage. As explained above, this stage process 100 may include, for example, several steps of adding the samples and/or multiplying them by coefficients to implement, e.g., a modulation, FFT or IFFT, or filtering process. Digital signal processing typically includes a combination of these stage processes 100.

The calculation module 330 then transmits the output samples 120 to the post-calculation module 340. The post-calculation module 340 determines the dynamic range in which each output sample 120 is to be represented (e.g., when writing the output samples 120 to memory 310) and then adjusts 440 the dynamic ranges of the output samples 120 accordingly. The post-calculation module 340 also records the dynamic range change relative to input dynamic range (or otherwise tracks the dynamic range) for each output sample 120 in the variable dr_shift(j), and records the smallest dynamic range decrease among the output samples 120 in the variable min_dr_shift(n). Rather than recording the dynamic range changes for the output samples 120, the post-calculation module 340 can alternatively track dynamic ranges, e.g., by recording a value that corresponds to the actual dynamic range for each output sample 120, perhaps using a look-up table to determine the dynamic range from that value.

As previously explained, given a finite word width, it is advantageous to represent the output samples 120 in a lower dynamic range to achieve greater precision—provided that no significant bits are lost. Accordingly, the post-calculation module 340 adjusts 440 the dynamic ranges of the output samples 120 according to an algorithm for achieving this increased precision. Preferably, the post-calculation module 340 lowers the dynamic range of one or more output samples 120 if possible without losing any of the output samples' significant bits. Depending on the notation scheme, lowering the dynamic range may be accomplished by bit shifting the word and dropping nonsignificant leftmost bits. The post-calculation module 340 can be programmed or otherwise configured to perform a number of algorithms for adjusting 440 the dynamic ranges, depending on the design parameters. An embodiment of the post-calculation adjusting 440 is illustrated in greater detail in FIG. 6.

Figure 6:
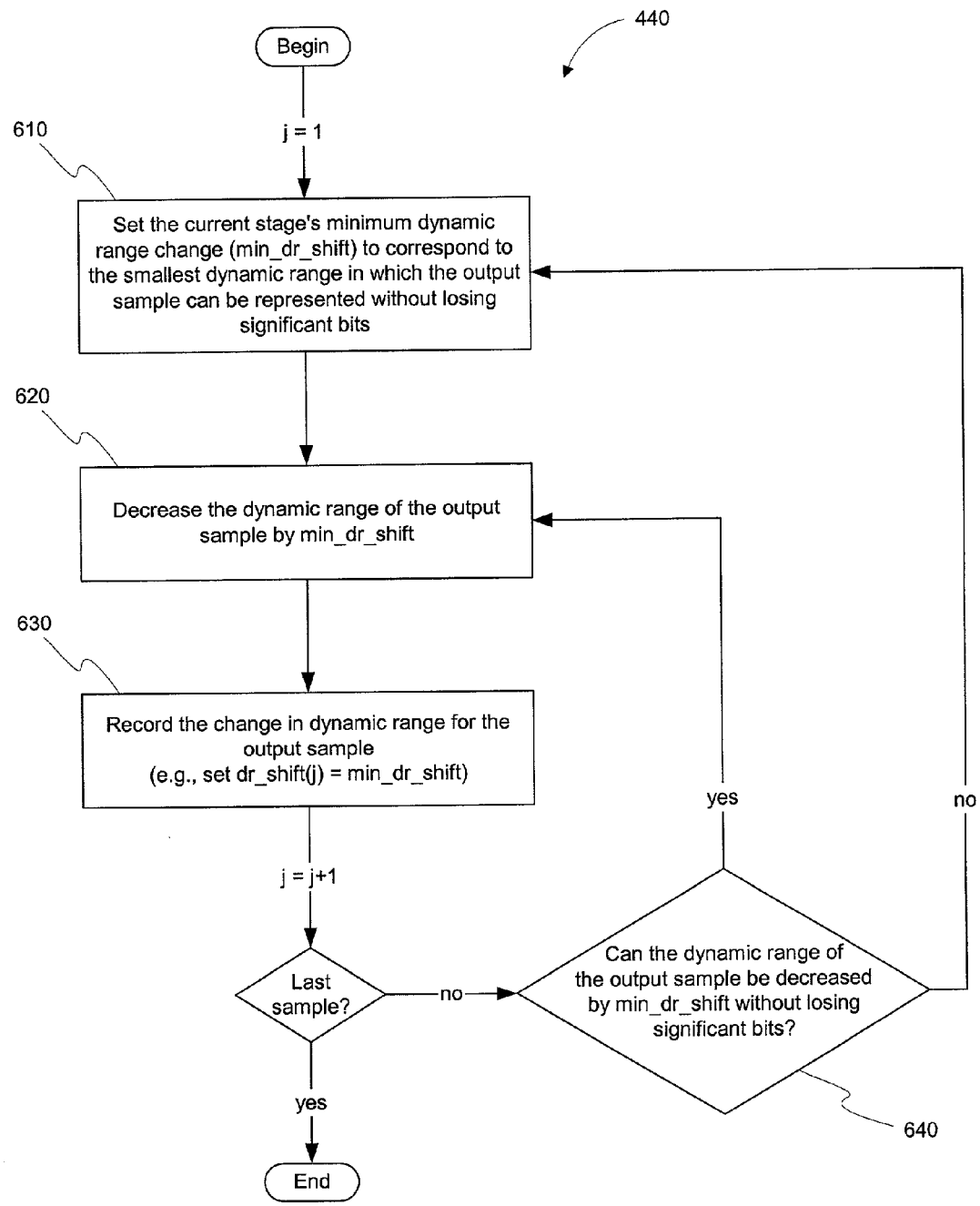
FIG. 6 is a flow chart of the postprocessing method according to an embodiment of the present invention.

FIG. 6 depicts an embodiment of the post-calculation dynamic range adjustment 440 of process 400. An advantage provided by the dynamic range adjustment 440 is to decrease the dynamic range of one or more output samples 120 before storing 450 the output samples 120 in memory 310 for processing in a subsequent stage. In this process 440, post-calculation module 340 performs the following actions 610 through 640 for each $j^{th}$ input sample 110 (e.g., for j=1 to J).

In action 610, the post-calculation module determines the minimum dynamic range in which the output sample 120 can be represented without losing significant bits (e.g., FIG. 2). The difference between the current dynamic range and this minimum dynamic range, for the $j^{th}$ output sample 120, is stored in the variable dr_shift(j). In one embodiment, the dynamic range change relative to the input can be determined from the calculation:

$$\text{min\_dr\_shift} = \log_2\left[\frac{D_o(n, j)}{D_i(n)}\right], \quad (1)$$

where $D_o(n,j)$ denotes the smallest dynamic range in which the $j^{th}$ output sample 120 of the $n^{th}$ stage can be represented without losing a significant bit, and $D_i(n)$ denotes the dynamic range in which the input samples 110 of the $n^{th}$ stage are actually represented. $D_o(n,j)$ can be determined by any conventional dynamic range calculation method, such as overflow/underflow checking or level detection checking. After min_dr_shift is determined, the post-calculation module 340 then performs action 620.

In action 620, the post-calculation module 340 decreases the dynamic range of the output sample 120 by the amount min_dr_shift. After action 620, the post-calculation module 340 performs action 630. In action 630, the post-calculation module 340 records the change in dynamic range for the output sample 120 by setting the variable dr_shift(j) to equal min_dr_shift.

After action 630, the system 300 increments j and, if there are still output samples 120 to process (i.e., if j is not larger than J), the post-calculation module 340 determines 640 if the dynamic range of the next output sample can be decreased by min_dr_shift without losing significant bits. If so, action 620 follows; otherwise, action 610 follows. The post-calculation module 340 performs the actions according to the flow described with reference to FIG. 6 until there are no more output samples 120 to process for the current stage (i.e., j>J).

In the embodiment of the post-calculation adjusting process 440 shown in FIG. 6, the post-calculation module 340 selects for each of the output samples 120 a dynamic range that is the larger of (1) the smallest dynamic range in which the output sample can be represented without losing a significant bit, and (2) the largest dynamic range selected for any previously processed output sample. This embodiment optimizes precision by selecting the lowest feasible dynamic range for a given set of output samples 120. The embodiment further avoids selecting (for a given output sample 120) a lower dynamic range than the largest dynamic range already selected for a previously processed output sample 120. This is advantageous because, in the case where pre-calculation normalizing 420 is performed, selecting a lower dynamic range would be wasteful. Were the embodiment to select for one output sample 120 a dynamic range lower than another output sample's dynamic range, the pre-calculation module 320 would have to increase the dynamic range of the former output sample 120 during the normalizing process 420.

Additionally, it is apparent that this embodiment of the method will not select for each of the output samples 120 a dynamic range that is smaller than the smallest dynamic range in which the output sample can be represented without losing a significant bit. By selecting a dynamic range in this manner, the embodiment advantageously avoids losing significant bits when, e.g., storing the computed output samples 120 to a memory 310 for processing in the next stage. Accordingly, the embodiment automatically avoids overflow errors that occur when significant bits of an output sample 120 are lost.

Referring back to FIG. 4, the post-calculation module 340 stores 450 the shifted output samples 120 in the memory 310 for processing as input samples 110 for the next stage. In an alternative embodiment, the output samples 120 from the post-calculation module 340 may be sent directly to the pre-calculation module 320 or calculation module 330 as input samples 110 of the next stage process 100. The dynamic range change for each of the stored output samples 120 is also recorded in the variable dr_shift(j). After all of the output samples 120 have been processed, the smallest decrease in dynamic range for that stage's set of output samples 120 is recorded 460 in the variable min_dr_shift(n).

The system 300 repeats processes 410 through 460 for each stage n, from n=1 to N. After the stage processes 100 are completed, the system 300 may apply 470 the final stage correction to the output samples 120 of the last stage N. The final stage correction is performed to ensure that the output samples 120 of the last stage N are expressed in the same dynamic range. This normalization can be performed in the same way as the pre-calculation normalization process 420 (shown in FIG. 5 and discussed in reference thereto). After applying 470 the final stage correction to the output samples 120, the variable dr_cnt represents the cumulative minimum decrease in dynamic range over the N stages. Therefore, the dynamic range of each final output sample 120 is the dynamic range of the original input samples 110 of the first stage decreased by the amount dr_cnt. If desired, the dynamic ranges of the set of output samples 120 of the last stage may be returned to the original dynamic range of the first stage's input samples 110 by right-shifting the last stage's output samples 120 according to dr_cnt. After applying 470 the final stage correction to the final output samples 120, the final stage processor 360 stores 480 the corrected output samples 120 into memory 310. The processed digital signal can then be, e.g., sent to a D/A converter for transmission over a DSL line.

The foregoing description of the embodiments of the invention has been presented for the purposes of illustration and description. It is not intended to be exhaustive or to limit the invention to the precise forms disclosed. Persons skilled in the relevant art can appreciate that many modifications and variations are possible in light of the above teaching. It is therefore intended that the scope of the invention be limited not by this detailed description, but rather by the claims appended hereto.

We claim:

1. A method for processing a digital signal in multiple stages, the method comprising:
   receiving a plurality of samples representing a digital signal, each sample represented electronically with a finite number of bits in a dynamic range;
   processing the samples through a series of coupled processing stages, wherein after at least one intermediate processing stage, the dynamic range of at least one of the samples is decreased without losing a significant bit; and
   passing the processed samples to an output interface.

2. The method of claim 1, wherein the dynamic range of at least one of the samples is decreased by:
   selecting for the sample the smallest dynamic range for the sample without losing a significant bit; and
   tracking the dynamic range for the sample.

3. The method of claim 1, wherein the dynamic range of at least one of the samples is decreased by:
   selecting for the sample a dynamic range that is the larger of:
   (1) the smallest dynamic range for the sample without losing a significant bit, and
   (2) the largest dynamic range already selected for any other sample between processing stages; and
   tracking any dynamic range decrease for each output sample.

4. The method of claim 3, wherein tracking any dynamic range change includes recording a change in dynamic range for each sample.

5. The method of claim 1, further comprising:
   pre-processing the samples before processing the samples.

6. The method of claim 1, further comprising:
   before each processing stage, normalizing the samples to be expressed in the same dynamic range.

7. The method of claim 1, wherein each of the samples are represented electronically with a different number of bits after a processing stage compared to before.

8. The method of claim 1, wherein the samples are represented in two's complement binary notation.

9. A method for increasing the precision of a digital signal processed in multiple consecutive stages, the method comprising:
   reading a plurality of input samples, the input samples corresponding to an output from a previous stage;
   calculating a plurality of output samples using the input samples; and
   for at least one output sample, decreasing the dynamic range of the output sample without losing a significant bit.

10. The method of claim 9, wherein decreasing the dynamic range comprises selecting the smallest dynamic range for the output sample without losing a significant bit.

11. The method of claim 9, wherein decreasing the dynamic range comprises:
    selecting for each output sample a dynamic range that is the larger of:
    (1) the smallest dynamic range for the output sample without losing a significant bit, and
    (2) the largest dynamic range selected for any previously processed output sample.

12. The method of claim 9, further comprising:
    before calculating the output samples, normalizing the input samples to be expressed in the same dynamic range.

13. The method of claim 9, further comprising:
    storing the output samples in a memory for use in a next stage.

14. A method for increasing the precision of a digital signal processor, the method comprising:
    receiving a plurality of input samples representing a digital signal, each sample represented electronically with a finite number of bits in a dynamic range;
    calculating a plurality of output samples using the input samples;
    decreasing the dynamic range of one or more of the output samples without losing a significant bit; and
    passing the processed digital communications signal to an output interface of the digital signal processor.

15. The method of claim 14, wherein decreasing the dynamic range of each output sample comprises:
    selecting for an output sample the smallest dynamic range for the output sample without losing a significant bit; and
    tracking the dynamic range for each output sample.

16. The method of claim 14, wherein decreasing the dynamic range of each output sample comprises selecting for the output sample a dynamic range that is the larger of:
    (1) the smallest dynamic range for the output sample without losing a significant bit, and
    (2) the largest dynamic range selected for any previously processed output sample.

17. The method of claim 14, wherein the output samples are represented in two's complement binary notation.

18. A device for processing a digital signal in multiple stages, the device comprising:
    a calculation module adapted to compute a set of output samples using a set of input samples; and
    a post-calculation module operatively coupled to the calculation module, the post-calculation module adapted to decrease the dynamic range of at least one of the output samples for at least one stage without losing a significant bit.

19. The device of claim 18, wherein the calculation module is coupled to the post-calculation module for receiving therefrom the output samples of a particular stage to use as input samples of a next stage.

20. The device of claim 18, wherein the calculation module comprises a plurality of calculation modules, each calculation module adapted to compute a set of output samples using a set of input samples for one or more of the multiple stages.

21. The device of claim 18, wherein the post-calculation module is adapted to set the dynamic range of each of the output samples, for a particular stage, to be the larger of:
    (1) the smallest dynamic range for the output sample without losing a significant bit, and
    (2) the largest dynamic range selected for a previously processed output sample in the stage.

22. The device of claim 18, further comprising a pre-calculation module coupled to the calculation module, the pre-calculation module adapted to normalize the dynamic ranges of the input samples.

23. The device of claim 18, further comprising a final stage processor coupled to the post-calculation module, the final stage processor adapted to normalize the dynamic ranges of the output samples of a final stage.

24. The processor of claim 23, further comprising a dynamic range summer coupled to the post-calculation module, the dynamic range summer adapted to calculate a cumulative decrease in dynamic range over the multiple stages.

25. The processor of claim 23, wherein the final stage processor is adapted to increase the dynamic ranges of the output samples of the final stage by a cumulative decrease in dynamic range over the multiple stages.

26. A multi-stage digital signal processor comprising:
   a calculation module adapted to compute a first set of output samples using a first set of input samples;
   a post-calculation module operatively coupled to the calculation module, the post-calculation module adapted to decrease the dynamic range of at least one of the first set of output samples without losing a significant bit; and
   a second calculation module coupled to the post-calculation module, the second calculation module adapted to compute a second set of output samples using a second set of input samples, the second set of input samples corresponding to the first set of output samples.

27. A device for processing a digital signal in multiple stages, the device comprising:
   a plurality of stage modules operatively coupled together, the stage modules adapted to process one or more stages, a stage module comprising:
      a calculation module adapted to compute a set of output samples using a set of input samples; and
      a post-calculation module operatively coupled to the calculation module, the post-calculation module adapted to decrease the dynamic range of at least one of the output samples without losing a significant bit;
   wherein the set of output samples for a particular stage module is used for the set of input samples for a next stage module.

28. The processor of claim 27, wherein at least two stage modules share a calculation module.

29. A device for processing a digital signal in a series of consecutive stages in which a set of output samples for one stage corresponds to a set of input samples for a subsequent stage, the device comprising:
   a storage means for storing the input and output samples of each stage;
   a calculation means, for each stage, for computing a set of output samples using a set of input samples; and
   a postprocessing means for increasing the number of least significant bits retained for an output sample without losing a significant bit.

30. The device of claim 29, wherein the postprocessing means comprises a means for adjusting the dynamic range of an output sample.

31. A DSL modem comprising:
   an input port for receiving a data signal;
   a digital signal processor adapted to receive the data signal from the input port and process the data signal in multiple stages, each stage resulting in a plurality of output samples derived from a plurality of input samples, wherein the digital signal processor is adapted to decrease the dynamic range of one or more output samples of one or more stages without losing a significant bit; and
   an interface coupled to the digital signal processor for receiving therefrom a processed data signal, the processed data signal corresponding to a plurality of output samples from one of the stages.

32. The modem of claim 31, further comprising:
   an analog front-end coupled to the interface, the analog front end adapted to convert the data signal to an analog format for being transmitted over a local loop.

33. The modem of claim 31, wherein the digital signal processor performs discrete multi-tone modulation on the data signal in one or more of the stages.

* * * * *